July 2, 1963  J. H. HOLLYDAY  3,095,961
BALE THROWER
Filed Sept. 30, 1960  2 Sheets-Sheet 1

INVENTOR
JAMES H. HOLLYDAY
Joseph A. Brown
ATTORNEY

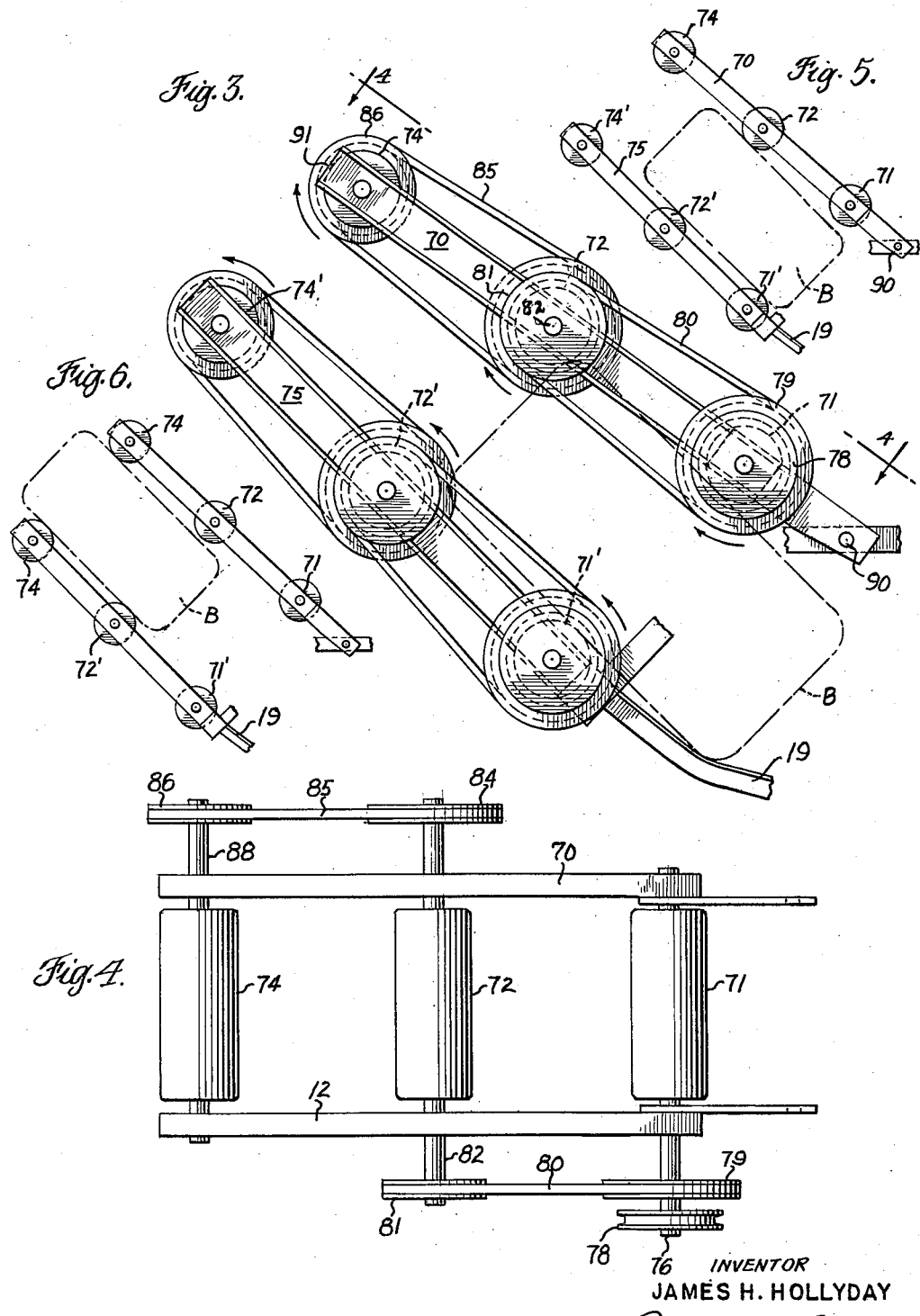

3,095,961
BALE THROWER
James H. Hollyday, New Holland, Pa., assignor to Sperry Rand Corporation, New Holland, Pa., a corporation of Delaware
Filed Sept. 30, 1960, Ser. No. 60,254
3 Claims. (Cl. 198—128)

This invention relates to a bale thrower connected to the discharge end of a hay baler and operable to toss each emerging bale into a trailing wagon.

Heretofore, a bale thrower has been provided comprising a pair of endless conveyors mounted one above the other at the discharge end of a baler and between which each emerging bale passes. The conveyors may comprise belts, rollers or a combination of both. They operate continuously, having bale engaging friction surfaces which impart velocity to each emerging bale. When a series of rollers are used on the conveyors, the first bale engaging roller of each conveyor has the greatest rotatable movement relative to the bale to be thrown. There is less relative movement between subsequent rollers and the bale since the bale progressively increases in velocity as it moves through the thrower. Therefore, there is a greatest loss of work at the first bale engaging roller of each conveyor, and progressively less towards the last bale engaging roller.

One object of this invention is to provide a bale thrower of the character described which will operate more efficiently and with less work loss than similar throwers of prior design.

Another object of this invention is to provide a bale thrower having a pair of cooperative endless conveyors which progressively increase the velocity of a bale to be thrown, successive bale engaging conveyor rollers of each conveyor operating at progressively increased speeds from a first to a last bale engaging roller.

Another object of this invention is to provide a bale thrower of the character described which will operate to throw a bale with a minimum amount of leaf loss from the bale.

A further object of this invention is to provide a bale thrower having a pair of bale engaging cooperative endless conveyors, the relative movement between each conveyor and the bale thrown being held to a minimum whereby wear and tear on the conveyor is minimized.

Other objects of this invention will be apparent hereinafter from the specification and from the recital in the appended claims.

In the drawings:

FIG. 3 is a fragmentary side elevation of a bale thrower constructed according to another embodiment of this invention;

FIG. 4 is a plan view of FIG. 3; and

FIGS. 5 and 6 are generally diagrammatic side elevational views, on a reduced scale, showing the operation of the bale thrower illustrated in FIGS. 3 and 4.

Figure 1:
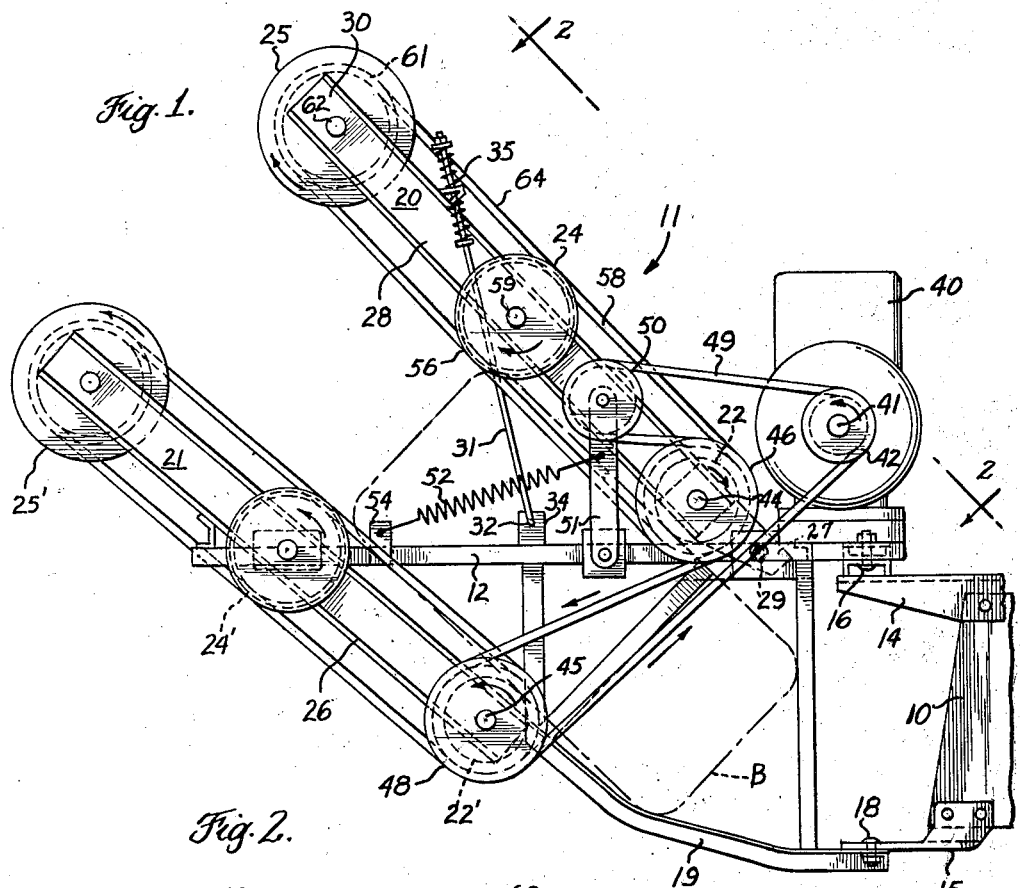
FIG. 1 is a side elevation of a bale thrower constructed according to one embodiment of this invention.
Figure 2:
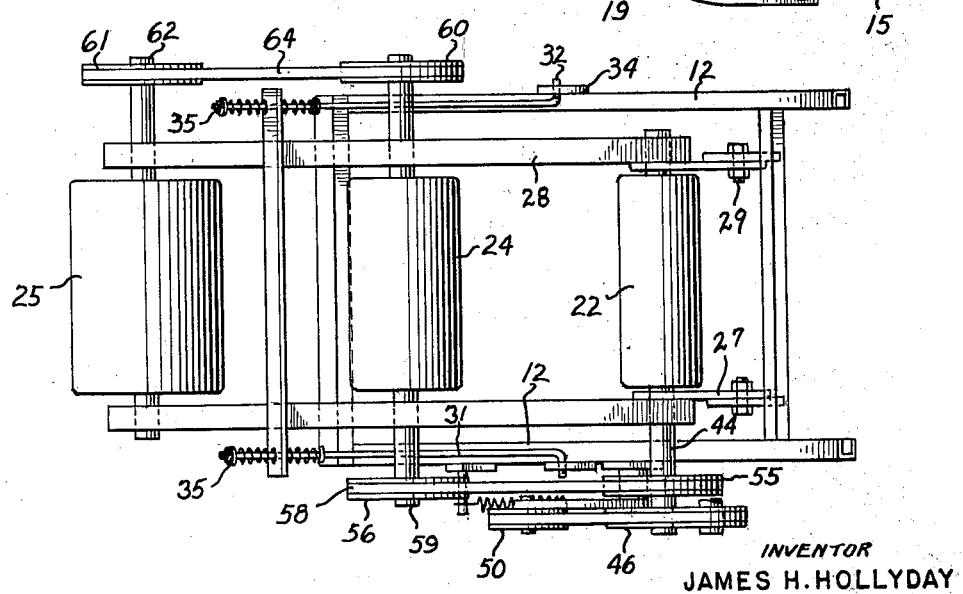
FIG. 2 is a plan view of FIG. 1.

Referring now to the drawings by numerals of reference, and first to the embodiment of the invention shown in FIGS. 1 and 2, 10 denotes the bale case of a hay baler from which bales B successively emerge. Mounted on bale case 10 and operable to throw each emerging bale to a trailing wagon, not shown, is a bale thrower 11. Thrower 11 comprises a frame structure 12 having brackets 14 and 15 bolted to the top and bottom, respectively, of the bale case. The structure connecting the thrower to the baler includes aligned pivots 16 and 18 which provide a vertical axis about which the thrower is laterally swingable.

The thrower includes a plate 19 which extends rearwardly and upwardly from adjacent the bottom of bale case 10 to guide and direct each emerging bale in an upward direction. When the bale has substantially emerged from the baler it is engaged by upper endless conveyor 20 and lower endless conveyor 21. These conveyors engage the top and bottom, respectively, of each bale. Each conveyor comprises a plurality of bale engaging rollers, the upper conveyor having a first roller 22, a second roller 24 and a third roller 25. The corresponding rollers of the lower conveyor are denoted 22', 24' and 25'. As shown best in FIG. 2, the second roller 24 of conveyor 20 is of larger diameter than the roller 22. Likewise, the third roller 25 is of larger diameter than roller 24. Specifically, roller 24 is one and one half times the size of roller 22 and roller 25 is twice as large as roller 22. This establishes a roller ratio of one, one and one half and two. The rollers in lower conveyor 21 are identical with the rollers in upper conveyor 20.

The rollers of lower conveyor 21 are supported on a frame 26 fixedly carried on the framework 12 of the thrower. The lower, forward roller 22' has a periphery which projects slightly above the surface of the plate 19 to engage and slightly lift the lower forward portion of each emerging bale. Upper endless conveyor 20 has a frame 28, the lower forward end 27 of which is pivotally connected at 29 to the frame 12. The upper rearward end 30 of the conveyor 20 is swingable in a vertical plane about the pivotal axis 29. The at-rest extension of the upper conveyor 20 is determined by support rods 31 pivotally connected at 32 to bracket members 34. The upper end of each rod 31 is connected to conveyor 20 by double acting spring means 35. While the rods 31 limit downward pivoting movement of the upper conveyor 20, they allow it to swing upwardly about the transverse pivot axis 29.

The first rollers 22 and 22' of the upper and lower conveyors, respectively, are spaced apart a distance approximately equal to the distance between the top and bottom of each emerging bale. These rollers rotate in opposite directions, the roller 22 rotating in a clockwise direction when viewed as shown in FIG. 1 and the roller 22' rotating in a counterclockwise direction. The rollers 24 and 25 also rotate in a clockwise direction while the rollers 24' and 25' rotate counterclockwise.

All of the rollers of both conveyors are power driven. The power is derived from a variable speed engine 40 having an output shaft 41 on which a pulley 42 is mounted. The shafts 44 and 45 for rollers 22 and 22' respectively, have pulleys 46 and 48 connected thereto. An endless belt 49 extends around pulley 42 and around pulleys 46 and 48. A belt tightener 50 is provided for keeping the belt 49 tight. Tightener 50 is supported on a pivoted lever arm 51 biased towards a tightening position by a spring 52 interconnected between the lever arm 51 and a bracket 54 on frame 12. The pulleys 46 and 48 drive through the shafts 44 and 45 to rotate the rollers 22 and 22'. To drive the other rollers of the conveyors, each conveyor is provided with drive means as shown best in FIG. 2. While the drive for rollers 24 and 25 is shown for the upper conveyor 20 only, it will be understood that the lower conveyor rollers are similarly driven. Keyed to shaft 44 is a pulley 55 which operates to drive a pulley 56 through an endless belt 58. The pulley 56 is connected to the shaft 59 of roller 24. The opposite end of shaft 59 has a pulley 60 which is connected to a pulley 61 on the shaft 62 of roller 25 by belt 64.

All of the pulleys 46, 55, 56, 60 and 61 are of the same diameter. Therefore, the speed of each roller shaft is the same. However, since the roll diameters are different, the peripheral speeds of the rollers will be different. Roller 24 has a greater peripheral speed than roller 22 and roller 25 has a peripheral speed greater than roller 24. Likewise, the peripheral speed of roller 24' is greater than that of roller 22' and roller 25' has a greater peripheral speed than roller 24'.

As each bale emerges from bale case 10, it is first engaged by the rollers 22 and 22'. Since these rollers are rotating at the slowest speed of the conveyor, they gradually impart velocity to the bale. By the time the bale reaches the rollers 24 and 24', it has increased in speed. Rollers 24 and 24' rotating more rapidly than rollers 22 and 22' add additional velocity to the bale. The speed of the bale picks up further and it is engaged finally by the rollers 25 and 25' which are rotating at the highest speed and provide the last increase in throwing speed to the bale. By having the bale engaging rollers operating at different peripheral speeds, which progressively increases from the first bale engaging rollers to the last bale engaging rollers, a gradually increased velocity is applied to each bale thrown. This reduces the amount of movement of the rollers 22 and 22' relative to the bale as well as the rollers 24 and 24'. The reduction of this relative movement results in less leaf loss from the bales thrown and greater efficiency is achieved with less power.

Referring now to FIGS. 3 and 4, a thrower is shown constructed according to another embodiment of this invention. As upper conveyor 70 is provided having bale throwing rollers 71, 72 and 74. A lower endless conveyor 75 has bale engaging rollers 71', 72' and 74'. All of the rollers in both conveyors are of the same diameter. However, they are driven at different speeds. The drive means provided for each conveyor is shown best in FIG. 4. The shaft 76 to the roller 71 is driven from the thrower engine through a pulley 78. A pulley 79 is connected to the shaft 76 and drives through an endless belt 80 to a pulley 81 connected to one end of a shaft 82 of roller 72. The opposite end of the shaft 82 has a pulley 84 which operates through an endless belt 85 to drive a pulley 86 connected to the last roller 74 through a shaft 88. The pulley arrangement is such that the roller 72 rotates at one and one half times the speed of the roller 71. The roller 74 is driven at twice the speed of roller 71. Therefore, the roller 72 rotates faster than roller 71 and roller 74 rotates faster than roller 72. This same relationship of roller speeds is provided for the rolls 71', 72' and 74'. Therefore, as each bale emerges from the bale case 10, it is engaged by the cooperative endless conveyors 70 and 75 and a gradually increased velocity is imparted to the bale.

To minimize drag, upper conveyor 70 is pivotally mounted at 90 so that the upper end 91 of the frame of the conveyor may move in a vertical plane toward and away from the lower conveyor 75. When a bale B first emerges, it is engaged by the two rollers 71 and 71', FIG. 3. When it has passed to the position shown in FIG. 5, the bale is engaged by the rollers 72 and 72'. The engagement of roller 72 with the bale causes upper conveyor 70 to pivot about pivot point 90. Roller 71 is moved transversely relative to the path of travel of the bale B and out of engagement therewith. In like respect, when the last roller 74 engages the bale as shown in FIG. 6, both rollers 71 and 72 are moved out of engagement with the bale. Therefore, as the bale B moves outwardly and increases in velocity, the rollers in conveyor 70 which are traveling at slower speeds are removed from contact with the bale. Such disengagement of rollers responsive to subsequent engagement of other rollers is provided for upper conveyor 70 only. The rollers of lower conveyor 75 are mounted in a fixed relationship relative to the emerging bales. While the roll removal is shown in connection with the embodiment of the invention shown in FIGS. 3 and 4, it will be understood that the upper conveyor 20 shown in FIG. 1, is also mounted so that when the roller 24 engages the emerging bale B, frame 28 pivots about axis 29 and roller 22 is moved from engagement therewith. Likewise, when the roller 25 engages the bale, the roller 24 is moved out of engagement with the bale.

The structure described provides a thrower which operates at maximum efficiency and a minimum amount of work loss. The rotatable movement of the rollers relative to the emerging bale is minimized. The thrower uses to a maximum amount, the power output of the engine 40. Since the relative movement of the rollers to each emerging bale is reduced to a minimum, there is less wear and tear on the rollers and less leaf loss of the bales thrown.

While this invention has been described in connection with two different embodiments thereof, it will be understood that it is capable of further modifications and this application is intended to cover any variations, uses or adaptations following, in general, the principles of the invention and including such departures from the present disclosure as come within known or customary practice in the art to which the invention pertains and as fall within the scope of the invention or the limits of the appended claims.

Having thus described my invention, what I claim is:

1. A bale thrower mountable on the discharge end of a hay baler to receive discharged bales and traject them distantly from the baler, said thrower comprising an upper and a lower conveyor coextensive and engageable respectively with the top and bottom sides of each bale discharged from the baler, each conveyor having a plurality of high speed power driven rollers spaced relative to each other and successively engageable with each bale and including a first roller adjacent the baler and at least one other roller more remote therefrom, means rotating the first roller in each conveyor at a given speed and the other roller of each conveyor at a faster speed whereby to progressively increase the application of throwing force to each bale, the space between said first roller and said remote roller of each conveyor being such relative to the lengths of said discharged bales that when the bales engage the remote rollers portions of the bales are in engagement with the first rollers, the rollers in the upper conveyor being driven at substantially the same speed as the corresponding rollers in the lower conveyor and both conveyors cooperating in imparting a throwing force to each bale.

2. A bale thrower as recited in claim 1 wherein means is provided for mounting the rollers of said upper conveyor for shiftable movement transversely relative to an emerging bale and out of engagement therewith responsive to engagement of other of the rollers with the bale.

3. A bale thrower as recited in claim 1 wherein the rollers of said upper conveyor are carried on an inclined frame having one end supported for pivotal movement about a fixed horizontal axis and having an opposite end swingable in a vertical plane about such axis, and normal extension of said frame projecting across the path of an emerging bale and the other roller of the upper conveyor upon engaging a given bale pivoting the frame and moving said first roller out of engagement therewith.

References Cited in the file of this patent

UNITED STATES PATENTS

| | | |
|---|---|---|
| 650,410 | Morin | May 29, 1900 |
| 1,712,576 | McArthur et al. | May 14, 1929 |
| 2,490,381 | Shields | Dec. 6, 1949 |
| 2,744,616 | Shields | May 8, 1956 |
| 2,827,154 | Forth et al. | Mar. 19, 1957 |
| 2,916,138 | Hume | Dec. 8, 1959 |
| 2,970,537 | Wardwell | Feb. 7, 1961 |
| 2,979,330 | Weber | Apr. 11, 1961 |

OTHER REFERENCES

Operators Manual No. 10, Bale Thrower Attachment for McCarmick's Nos. 46 and 56 Balers, July 19, 1960.